No. 886,895. PATENTED MAY 5, 1908.
J. T. TOLAND.
ATTACHMENT FOR SULKIES AND GANG PLOWS.
APPLICATION FILED NOV. 16, 1907.
2 SHEETS—SHEET 1.
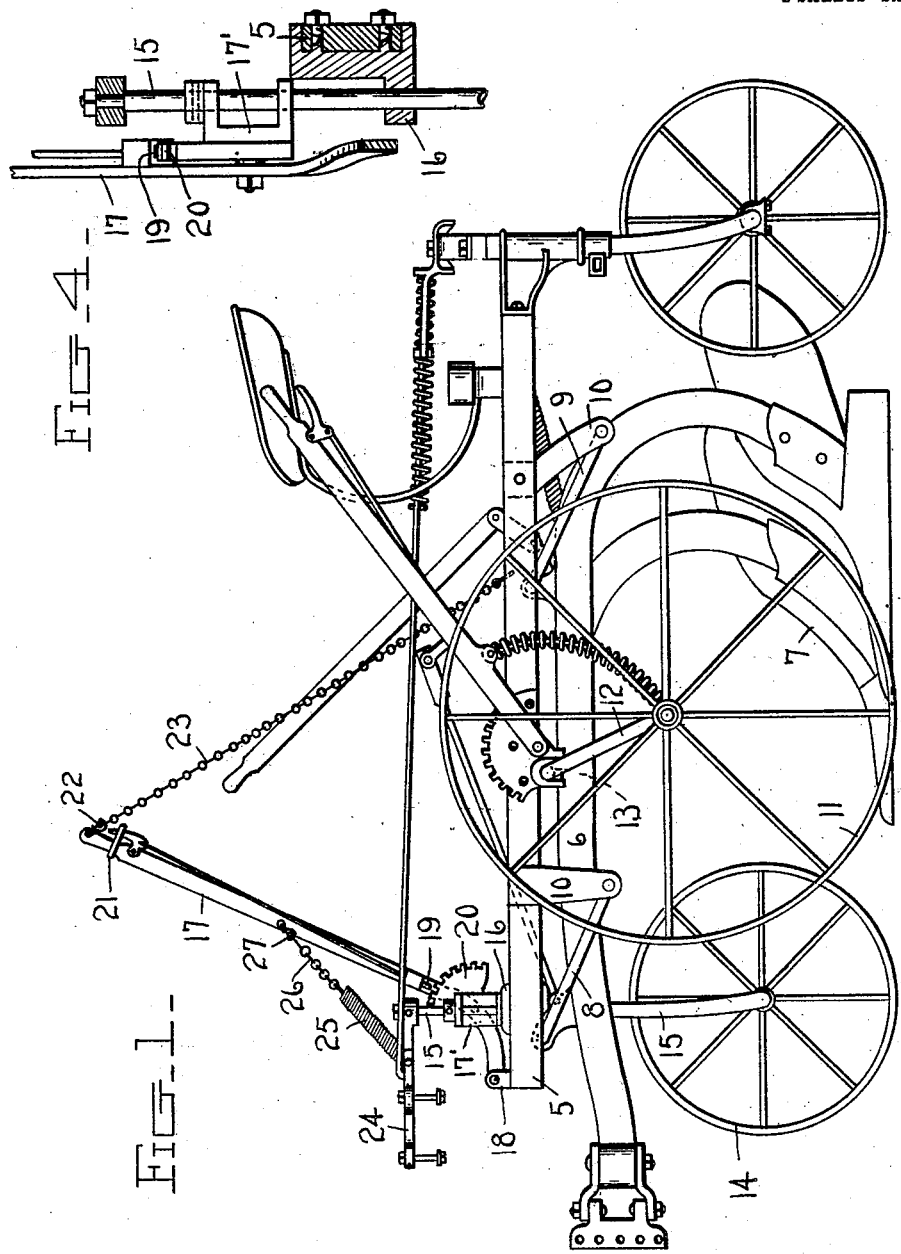
Witnesses
L. B. James
John S. Powers
Inventor
J. T. Toland
By Chandler & Chandler
Attorneys No. 886,895. PATENTED MAY 5, 1908.
J. T. TOLAND.
ATTACHMENT FOR SULKIES AND GANG PLOWS.
APPLICATION FILED NOV. 16, 1907.
2 SHEETS—SHEET 2.
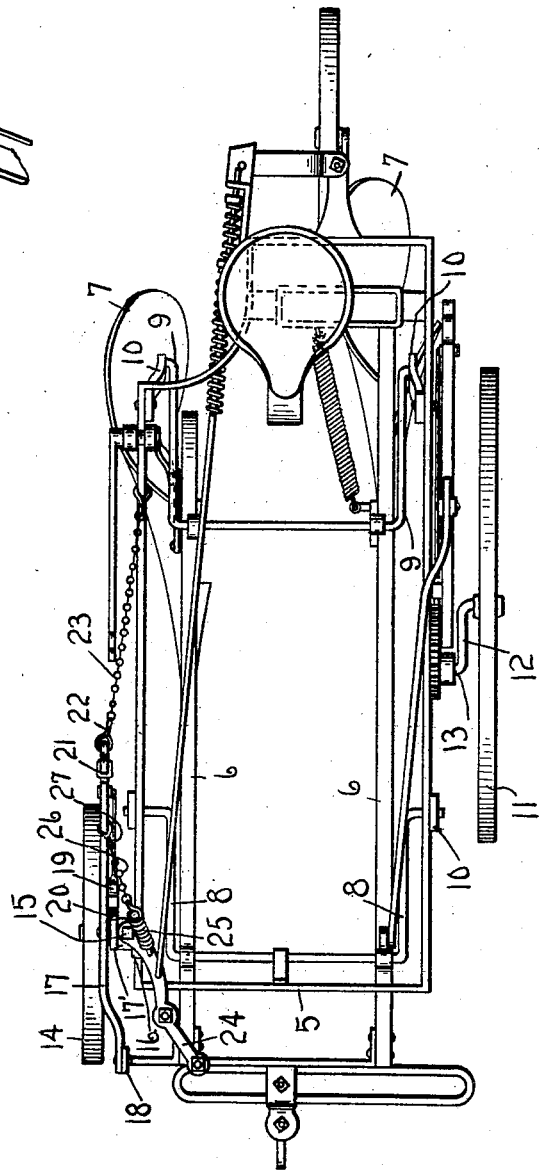
Witnesses
L. B. James
John D. Powers
Inventor
J. T. Toland
By Chandler & Chandler
Attorneys

UNITED STATES PATENT OFFICE.

JOHN T. TOLAND, OF ATWATER, MINNESOTA.

ATTACHMENT FOR SULKIES AND GANG-PLOWS.

No. 886,895.  Specification of Letters Patent.  Patented May 5, 1908.

Application filed November 16, 1907. Serial No. 402,485.

*To all whom it may concern:*

Be it known that I, JOHN T. TOLAND, a citizen of the United States, residing at Atwater, in the county of Kandiyohi, State of Minnesota, have invented certain new and useful Improvements in Attachments for Sulkies and Gang-Plows; and I do hereby declare the following to be a full, clear, and exact description of the invention, such as will enable others skilled in the art to which it appertains to make and use the same.

This invention relates to new and useful improvements in plows and it has more particular reference to a stone dodging attachment for gang or sulky plows, the object being to provide a novel construction, combination and arrangement of parts.

The details of the invention will appear in the course of the following description, in which reference is had to the accompanying drawings, forming a part of this specification, like characters of reference designating similar parts, throughout the several views, wherein:—

Figure 1 is a side elevation of a plow constructed in accordance with the present invention. Fig. 2 is a top plan view thereof. Fig. 3 is a detailed view of an unlocking device for the lever comprehended in the invention. Fig. 4 is a detailed sectional view showing a connection between the frame and a supporting standard.

The invention is shown as applied to a plow of the "Deere" sulky gang type. This particular type of plow, as is well known, includes a frame designated by the numeral 5, plow beams 6 carrying at their rear ends the plows 7, front and rear crank hangers 8 and 9 for the beams 6, the hangers 8 and 9 being adjustably connected by suitable conventional lever operated means with the frame 5, depending bracket bearings 10 for the offset ends of the hangers 8 and 9, a land wheel 11 mounted upon the crank arm 12 of a stub axle 13, journaled in one of the side bars of the frame 5, a furrow wheel 14 and a standard 15 which carries the furrow wheel and which passes through a sleeve 16 mounted at the front end and at one side of the frame 5. Pivoted to a bracket 17' mounted rigidly upon the standard 15, is a lever 17 having connection with the frame 5, by means of a lug 18. These elements are all well known in connection with a sulky plow of the above specific type and are herein illustrated to show the application of the attachment embodying the present invention.

The lever 17 is utilized as a salient element of the invention and in practice has its pawl 19 held from engagement with the rack 20 by a ring 21 surrounding the upper end of said lever and embracing the handle of the pawl. At the upper end of the lever 17, a snap hook 22 is provided, which is designed for engagement in selected links of a chain 23, the lower end of which is connected to the adjacent side bar of the frame 5. The chain 23 is of a length sufficient to allow of the lever 17 being moved to its fullest extent.

Projecting laterally from the upper end of the standard 15, is an arm 24, to which the tongue is secured. A retractile coil spring 25 is secured to one end of the arm 24 and at its other end is connected to a chain 26. Midway of the lever 7 a snap hook 27 is provided, which is designed for connection with a selected link of the chain 26.

In use, when any one of the plows 7 strikes a stone, the lever 17 being resiliently suspended, the plows and beams will rise and ride over the stone, the lever 17 having downward movement against the tension of the spring 25. As soon as stone is passed, the spring 25 raises the lever 17 to its upward limit as controlled by the chain 26, whereby the plows 7 will be forced into the ground. Thus, the stone dodging operation is automatic and no ground is left unplowed, except that taken up by the stone.

The frame is set at selected positions with relation to the standard 15, by raising or lowering the lever 17, this action being attained by taking up and letting out the respective chains 23 and 26 as will be readily understood.

What is claimed is:

A plow of the type set forth, comprising in combination with a frame, plows supported therefrom, a hand lever for raising and lowering said frame and plows and means for holding said hand lever at selected positions, a chain connected to said frame and adjustably to said hand lever at one side thereof for limiting the upward movement thereof, a tongue supporting element, a spring connected to said element and a chain connected to said spring and adjustably to said hand lever at the other side thereof to hold the latter to cause the plows to dig into the ground.

In testimony whereof, I affix my signature, in presence of two witnesses.

JOHN T. TOLAND

Witnesses:
A. D. LACY,
J. A. JOHNSON.